United States Patent
Fortune

[15] 3,676,761
[45] July 11, 1972

[54] AUTOMATIC TOOL SYSTEM AND METHOD FOR CONTROL

[72] Inventor: William S. Fortune, 14250 Dearborn Street, Panorama City, Calif. 91402

[22] Filed: Feb. 19, 1970

[21] Appl. No.: 12,727

[52] U.S. Cl. ................................. 318/574, 318/162, 90/13
[51] Int. Cl. .................................................. G05b 19/22
[58] Field of Search ..................... 318/572, 574; 90/13

[56] References Cited

UNITED STATES PATENTS

| | | | |
|---|---|---|---|
| 3,073,998 | 1/1963 | Bower | 318/572 |
| 2,832,023 | 4/1958 | Gough | 318/20.132 |
| 3,063,311 | 11/1962 | Beckwith et al. | 318/20.132 X |
| 3,497,780 | 2/1970 | Leenhouts | 318/20.132 X |

*Primary Examiner*—T. E. Lynch
*Attorney*—Daniel T. Anderson

[57] ABSTRACT

A circuit particularly useful for automating a standard machine-shop turret lathe. The circuit includes the capability of programming a sequence of events to be performed by the lathe. Mechanical actuators such as electrical motors and pneumatic pistons provide the capability of imparting movement to those lathe mechanisms usually operated manually. The operations of these lathe mechanisms are monitored by sensors such as photocells and microswitches. Pulses produced by the sensors are routed through the circuitry in a prescribed manner to produce the desired sequence of events.

18 Claims, 7 Drawing Figures

Fig.1

William S. Fortune
INVENTOR

Fig.2

William S. Fortune
INVENTOR

BY Daniel T. Anderson
ATTORNEY

William S. Fortune
INVENTOR.

BY Daniel T. Anderson
ATTORNEY

Fig. 7

William S. Fortune
INVENTOR.

BY
Daniel T. Anderson
ATTORNEY

3,676,761

AUTOMATIC TOOL SYSTEM AND METHOD FOR CONTROL

BACKGROUND OF INVENTION

Field of the Invention

A variety of power tools are found in machine shops and manufacturing firms. Included among these power tools are the conventional machine shop lathes. The invention disclosed is particularly suited to such lathes; however, the principles may be applied to other power tools such as drills presses, milling machines, and the like.

A product or part formed, in part or in whole, on a turret lathe may require many operations such as cutting, drilling, or reaming. It is desireable to maximize the useful operating time of any particular tool. This is particularly so when a large number of like parts are required. To this end, there has been offered in the prior art a number of automated power tools including automated lathes.

The prior art systems have had a number of significant limitations and disadvantages; e.g., many automatic type lathes are not capable of manual operation. Where design changes are frequent, the capability of manual operation of at least some machine functions may be a distinct advantage. Another serious limitation in the utilization of prior art highly automated machines is caused by their high cost; since as the degree of automation is increased, there is generally a sharp increase in cost. Even highly automated machines often do not include means for detecting machine errors or faulty operation. An automatic tool system is necessarily limited in performance if means including feedback systems are not included for detecting faulty machine operation.

Accordingly, it is an object of the present invention to provide an automated machine tool system in combination with a machine such as a turret lathe which is not subject to these and other disadvantages and limitations of the prior art.

It is another object of the present invention to provide a circuit for automating a turret lathe wherein the lathe is self-operating, self-fault-finding, and self-correcting.

It is yet another object of the present invention to provide a control system for automating a power tool which permits flexibility in the selection of operating functions and parameters thereof, and sequence of those events.

It is still another object of the present invention to provide a circuit for automating a power tool such as a turret lathe wherein the operation of the tool may be accomplished selectively automatically and/or manually.

It is a further object of the present invention to provide a means of automating a machine tool which enables the operation of the machine tool for long continuous periods of time.

SUMMARY OF INVENTION

A machine-tool control system is provided. The system includes mechanical actuators for replacing the manual movement of machine mechanisms. Each actuator is controlled by signals produced and processed in the associated circuitry. The machine tool may be a conventional turret lathe. The actuator may be an electrical motor connected through linkages to one of the lathe mechanisms such as, for example, the feed collet.

The control system further includes operation status sensors associated with each tool mechanism. The sensor detects a predetermined state of operation and provides a control signal representative thereof. The sensor may be a photocell for detecting the presence of a part or portion of the machine tool. The presence thereof may signal the start of another event.

The system also includes circuit means for distributing the control signals from a sensor to a preselected mechanical actuator so that each machine operation is performed in a preselected sequence. Flexibility of programming is provided, yet, the cost of automating a highly versatile shop lathe in accordance with the present combination is relatively low.

The automation of machine tools is further enhanced by the fault circuitry of the invention. The fault circuitry permits detecting undesireable operating conditions and terminating further machine operation.

The foregoing and other objects of the present invention will become more and better understood when taken in conjunction with the following description and accompanying drawings, throughout which like characters indicate like parts and which drawings form a part of this application.

DESCRIPTION OF PREFERRED EMBODIMENTS

By way of example only, and for purposes of clarity and brevity of presentation, the implementation of the invention is described as applied to a conventional machine shop turret lathe. Such a lathe usually has three major tool mechanisms. These mechanisms are the collet, the crossfeed, and the turret. Each of these are typically manually operated by such aids as levers and crank devices. The operation of such lathes may be enhanced by the use of mechanisms such as vacuum systems, coolant means, and the like, not shown.

In accordance with the present invention, each mechanism is provided with a mechanical actuator to replace the strictly manual operation thereof. Each lathe mechanism and mechanical actuator has associated therewith monitoring and control circuitry. The mechanical actuators are controlled by start and stop signals. The start signal originates in a signal distributor and a monitoring circuit sensor determines when an associated lathe operation is complete and generates a stop signal.

The automated turret lathe operation of the present invention is typically initiated by pressing a start button in the control circuitry. This generates a start signal which is routed through the signal distributor to a first preselected mechanical actuator thereby operating one of the lathe mechanisms. When the completion of that operation is sensed, a stop signal is used to terminate the operation of the first preselected actuator. The stop signal is also routed to the signal distributor. The stop signal may then become a start signal for a second lathe operation. The stop signal associated with the second lathe operation may then become a start signal for a third lathe operation. The entire operation, or selected portions thereof, of a lathe may be so automated. The sequence of start-stop signals continues until a finished workpiece is obtained. The last stop signal in the sequence may then become a start signal for a new cycle.

Figure 1:
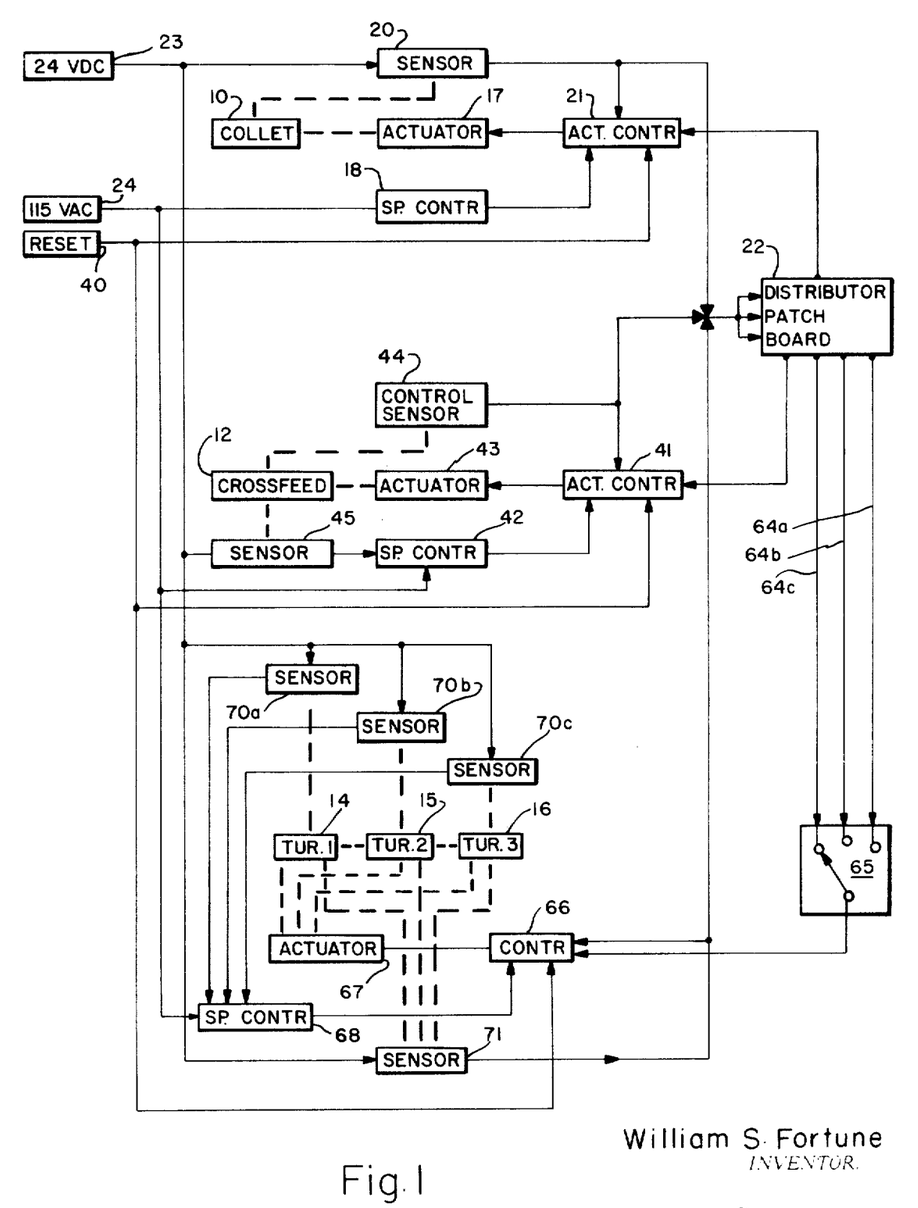
FIG. 1 is a block schematic diagram of an example of a control system constructed in accordance with the principles of the present invention and shown as applied to a turret lathe.

Referring now to FIG. 1, a lathe collet 10 constitutes a means of gripping the workpiece in the rotating lathe head. The grip is released as each workpiece is finished to allow new material to be introduced into the workpiece area, while the lathe head is still rotating.

A start signal from a signal distributor 22 is routed to a collet control circuit 21. This serves, in this example, to supply alternating current from a power bus 24 through a speed control 18 and to an actuator 17. The actuator 17 may be an electric motor linked to the collet mechanism. When the collet reaches a predetermined status, such as the closed position, a monitoring circuit sensor 20 generates a stop signal. The stop signal is routed to the collet control circuit 21 to terminate the power to the actuator motor 17. The stop signal is also routed to the signal distributor 22 to be rerouted as a new start signal.

The various stop and start signals of the example herein are electrical signals; however, fluidic devices may also be used to provide comparable or analog signals.

Figure 2:
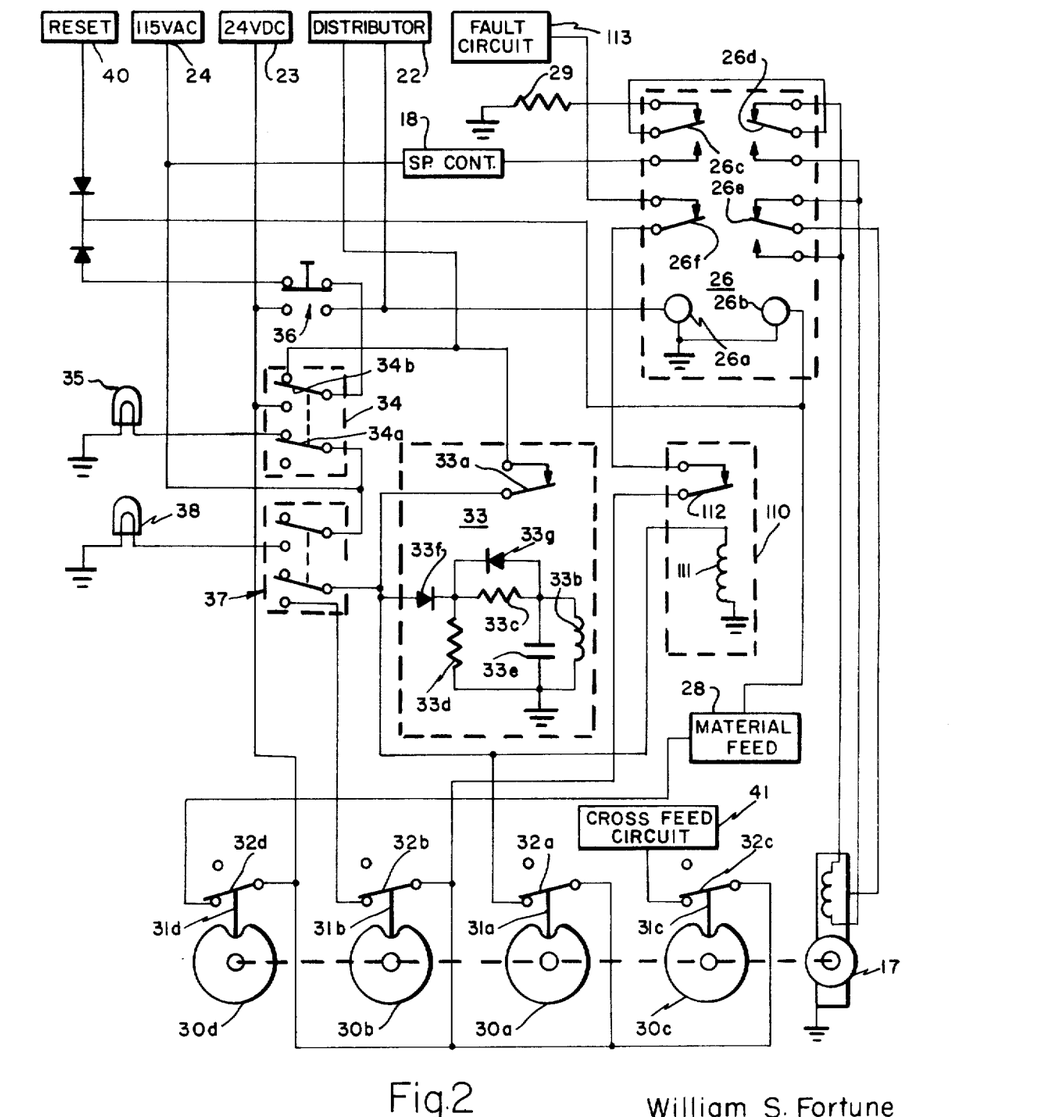
FIG. 2 is a more detailed schematic diagram of that portion of FIG. 1 which relates to the operation of the lathe feed collet.

An example of the collet control and monitoring circuitry is shown in more detail in FIG. 2. A start signal from the distributor 22 is routed to a collet motor relay 26. The relay 26 may be of the latching type and is shown here in the reset or off condition. The start signal is impressed on a set-coil 26a to switch the contacts. Power from the buss 24 is then supplied through the speed control 18 to contacts 26c, 26d, 26e of the relay 26. This permits power to be supplied to the armature and field windings of the motor 17.

An electrical pulse, or stop signal, supplied to the reset-coil 26b of the motor relay 26 will return the contacts to the off condition. This reverses the polarity in the motor 17 and grounds it through a grounding resistor 29 thereby bringing it to an abrupt and positive halt.

This stop signal may be generated in the collet monitoring circuitry. It is desireable to terminate the operation of the motor 17 when the collet reaches a closed position. To this end, a cam and follower switch arrangement is provided which includes cam 30a mounted on the shaft of the motor 17. A cam follower 31a imparts open-close movement to an electrical switch 32a. The cam 30a is positioned on the motor shaft so that the switch 32a is closed when the lathe collet reaches a closed position. The closing of the switch 32a provides electrical power from a source of 24 volt direct-current energy. This energy is impressed upon a one-shot switching circuit 33 and routed through the one-shot contacts 33a thereof to the signal distributor 22 and to the reset-coil 26b of the relay 26. The one-shot circuit components are selected to provide a predetermined time during which the contacts 33a are closed. Thereafter, the coil 33b causes the contacts 33a to open. The stop signal is therefore a pulse of predetermined duration.

All system stop signals are, in this example, of a similar pulse-shape type, and a stop signal may become a start signal. Thus, if a stop signal resets a motor latching relay to its off condition, the motor remains off until another start signal is directed to the motor relay set-coil.

Refinements may be included in combination with the collet control and monitoring circuitry as shown to increase the utility and flexibility of the system at minimal expense. For example, an auto-manual selector switch 34, shown here in the automatic mode, may be so included. The selector switch 34 may consist of a ganged pair of single pole double throw switches. Current from the power buss 24 may be supplied to a lamp 35 to indicate that the selector switch 34 is in the auto-position. When the switch 34 is placed in the manual position, energy from the buss 23 is supplied through a pole 34b to a push-button 36, which routes power to the reset-coil 26b of the relay 26 insuring that the motor 17 is inactive. If the push-button 36 is depressed, power is routed to the relay set-coil 26a thereby activating the motor. Thus, collet 10 may be manually manipulated by the depression of the push-button 36, provided the switch 34 is in the manual position. This combination is especially advantageous to the lathe operator during machine set-up.

An additional example is provided by the addition of a stop open-close switch 37 and a cam-follower switch 30b, 31b, 32b. The cam 30b is positioned so that switch 32b is closed when the collet reaches the open position. When the switch 37 is moved to the opposite position, as shown, the cam-switch 32b is actively in the monitoring circuit. A lamp 38 will then receive power from buss 24 to indicate the mode, stop-open-closed. In this configuration, the collet stops in the open position as well as in the closed position. A start signal must be supplied to initiate movement of the collet from each stop position. In this way, workpiece material may be hand-fed, when desired, through the open collet.

One or more combinations of cams, followers, and switches may be included so as to provide control signals at predetermined states of collet operation. Such signals may be routed directly to other circuitry components. For example, such an arrangement may, when desired, supply power to a material feeder 28 during that interval in which the collet is open. The cam 30d, the follower 31d, and the cam-switch 32d may be arranged to impress a start signal on the material feeder 28. The motor relay reset-coil 26b is electrically connected to the material feeder 28 to provide a stop signal which terminates or interupts the operation of the material feeder 28, the stopping of the material feeder 28 coinciding with the collet reaching the closed position.

An additional feature of the invention, a fault circuit, is discussed in further detail below. FIGS. 1 and 2 show a reset buss 40 and a fault circuit which supplies power to the reset buss 40 if conditions warrant terminating the operation of the lathe. Power, in that circumstance, is supplied from the reset buss 40 to all reset-coils including the reset-coil 26b shown in FIG. 2. Operation of the lathe cannot then proceed until the fault condition is eliminated.

CROSSFEED

FIG. 1 also schematically shows a lathe crossfeed 12 which operates to move cutting tools perpendicularly or radially inwardly toward the workpiece. Cutting tools may be mounted on opposite sides of the workpiece thereby to permit two nonidentical cuts to be made, generally, in sequence.

The crossfeed, in this example, is moved by a mechanical actuator which may be a crank and arm linkage driven by an electric motor. A 90 degree revolution of the crank first moves one cutting tool from an idle position into cutting engagement. A 180° revolution then moves the oppositely mounted tool into cutting engagement. There are two idle positions angularly separated by 180° of crank revolution.

A start signal received from the distributor 22 shown in FIG. 1 is processed by a crossfeed control circuit 41 to furnish operating power from the power buss 24 through a speed controller 42 to an actuator or motor 43. A control sensor 44 produces a stop signal for terminating the operation of the motor 43. A speed sensor 45 is responsive to a preselected crossfeed status indication to provide a speed control signal to the speed controller 42. In this way, the motor 43 may be operated at one speed for cutting and at higher, time-saving speeds during non-cutting intervals.

Figure 3:
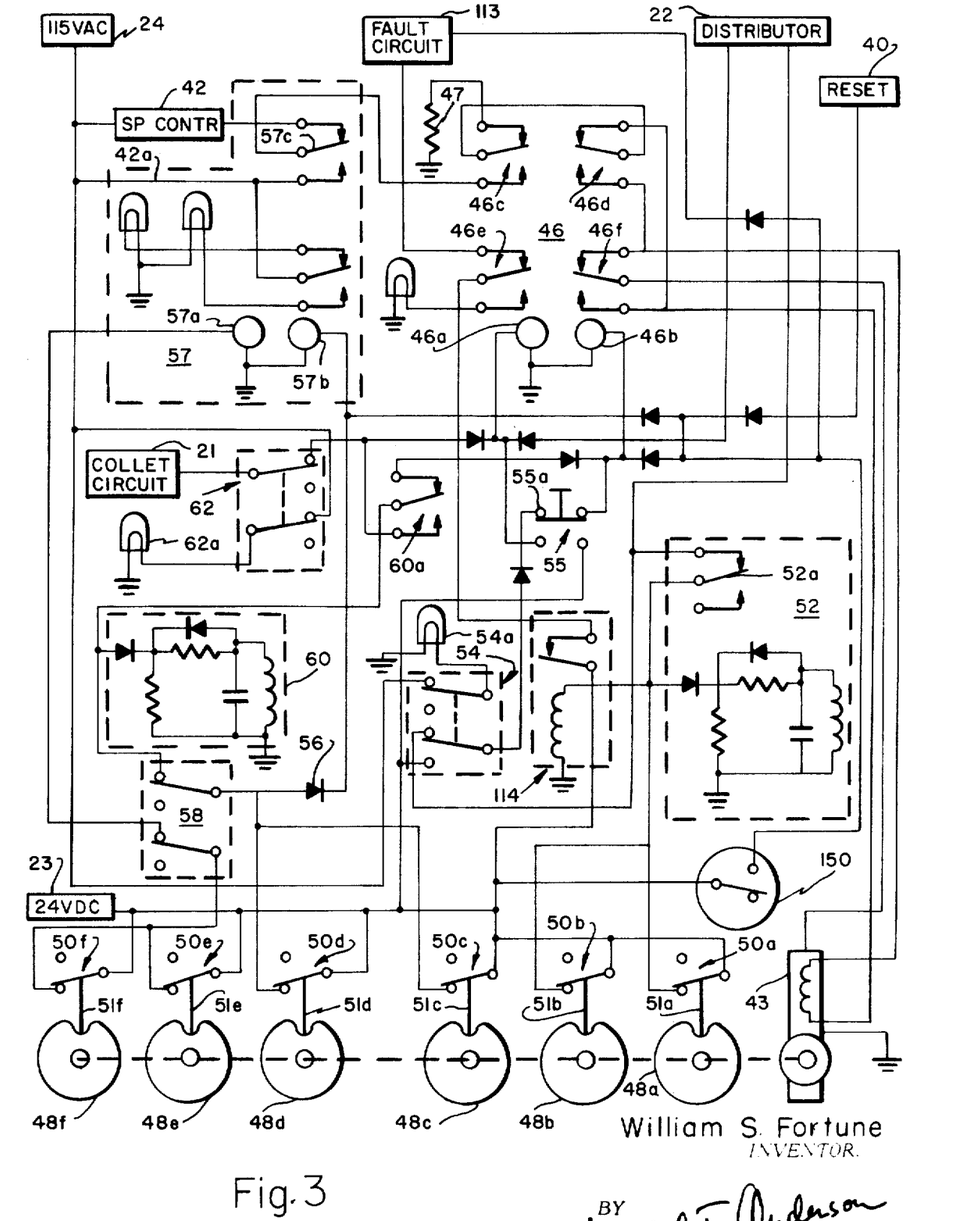
FIG. 3 is a more detailed schematic diagram of that portion of FIG. 1 which relates to the operation of the lathe crossfeed.

Further details of the crossfeed control and monitoring circuitry are shown in FIG. 3. The start signal from the distributor 22 is routed to the crossfeed control circuitry which includes a crossfeed latching relay 46. The start signal is impressed upon the relay-set coil 46a thereby setting the relay contacts oppositely from that shown. Power from the buss 24 is supplied through the speed controller 42 for slow speed motor operation; while the speed controller is by-passed for high speed operation. In either mode, power is routed through the relay contacts 46c, 46d, 46f to the crossfeed motor 43.

If a stop signal is impressed upon the relay reset-coil 46b, the contacts are positioned as shown and motor operation is terminated as in the case of the collet motor. Also as in the case of the collet motor, any crossfeed motor overrun is minimized by grounding through a resistor 47.

Also similarly to the collet monitoring circuitry, the crossfeed circuitry includes a set of cam-switches which provide relay voltages at preselected times which times are related to the angular position of the motor shaft. A cam 48a is positioned on the shaft of the motor 43 to correspond to the idle neutral position of one crossfeed cutting tool; and a cam 48b corresponds to the idle position of the other cutting tool.

If the crossfeed motor is operating, the cam switches 50a, 50b will be closed when the associated crossfeed cutting tool reaches its idle position. The cam-switches close when the followers 51a, 51b drop into the cam depressions or slots which correspond to the cutting tool idle positions. In this state of crossfeed operation, a signal is passed from the control buss 23 through one of the cam switches 50a, 50b to one-shot contacts 52a of a one-shot switching circuit 52. This circuit limits the signal to a pulse of predetermined duration which is routed through an auto-manual switch 54 to the reset-coil 46b of the relay 46. The crossfeed operation is thus terminated until another start signal is impressed upon the relay set-coil 46a. The foregoing stop signal, originating through one of the cam switches, 50a, 50b is also routed to the signal distributor 22 where it may become a start signal for another operation.

The one-shot switching circuit 52 is similar to the collet one-shot switching circuit 33 of FIG. 2. The auto-manual switch 54 operates in the manner of switch 34 of FIG. 2, shown in the automatic mode. A lamp 54a indicates when the automatic mode is active.

When the switch 54 of FIG. 3 is placed in the manual mode, the crossfeed may be manually controlled by depressing a push-button switch 55. Control voltage from the buss 23 will then be furnished to the relay reset-coil 46b and the crossfeed motor 43 is thereby inactivated. Depressing the switch 55 also removes voltage from the reset-coil 46b and supplies voltage to the set-coil 46a. The crossfeed mechanism may thereby be manually advanced.

The crossfeed control and monitoring circuitry thus far described is similar to the collet circuitry. The crossfeed mechanism further includes the capability of operating at various preselected speeds during various stages of operation. During the interval in which one of the crossfeed cutting tools is in engagement with the workpiece, it is desirable to move the crossfeed mechanism at a relatively slow speed. Relatively high speed movement at other times saves significant machine time during non-cutting periods of operation; i.e., when the cutting tool is moving into or away from the cutting area.

To this end, the operating speed of the motor 43, FIG. 3, is made selectively by the use of the speed controller 42. When current is drawn through the bypass conductor 42a, the motor 43 operates at full speed. When current is drawn through the speed controller 42, the motor speed is reduced. The speed controller 42 includes conventional means for selectively adjusting motor speed for the low speed mode of operation, and the circuit may be modified to include selectively of the high speed operation.

Also shown in FIG. 3 are a pair of motor shaft cams 48c, 48e which may be aligned so that the cam depression and cam follower 51c, 51e register when one of the crossfeed tools is in a position selected to begin a particular speed mode. Cam-switch 50c, when closed, routes a signal through a diode 56 and to the reset-coil 57b of the speed-mode latching relay 57. The contacts thereof will be as shown in FIG. 3, thus current is routed through the speed controller 42, through contact 57c, and thence to the motor 43. The speed controller is then actively in the circuit, i.e., the slow speed mode is operative.

The cam 48e is positioned on the shaft of the motor 43 to close the cam-switch 50e when high speed operation is desireable. Voltage is then impressed upon the set-coil 57a to position the relay contacts opposite to that shown. The conductor 42a then interconnects the power buss 24 to the motor relay 46.

In switching from the high speed mode to the low speed mode, the motor 43 may tend deleteriously to coast to the lower speed. To eliminate the coasting, the voltage signal from the low speed cam switch 50c is routed through the switch 58, through the contacts 60a of the one-shot circuit 60, and then to the motor relay reset coil 46b. The motor 43 is thereby turned off and braked to a halt through magnetic field reversal as explained above. The time delay of the one-shot switching circuit 60 is relatively short, e.g., in the order of a few miliseconds. After this time delay, the one-shot circuit contacts 60a reverse and current is thereby conducted to the motor relay set-coil 46a. In the meantime the speed controller 42 is activated and the current to the motor 43 therefore corresponds to a preselected slow speed. Thus, the motor is momentarily halted from the high speed and then operated in the low speed mode. The one-shot circuit 60 may be varied, when desired, to make the speed change nearly instantaneous.

Since a lathe crossfeed typically may carry two cutting tools, another pair of cam switches are shown for providing high and low speed operation therefore. These are shown as a low speed cam 48d, a follower 51d, a cam-switch 50d, and as a high speed cam 48f, a follower 51f and a cam-switch 50f.

Additional system flexibility may be achieved by including a collet-crossfeed crosscouple connection to provide means for routing a stop signal from the collet system directly to the crossfeed circuit as a start signal. Shown in FIG. 3 is a block 21 representative of the collet circuitry of FIG. 2. A collet stop signal may be routed through a crosscouple switch 62 to the motor relay set coil 46a as a signal to start the crossfeed operation. A lamp 62a is operative to indicate when the crosscouple line is actively a part of the circuit.

The origin of the crosscouple start signal is shown in FIG. 2. The cam 30c and the follower 31c combine to operate the switch 32c at a predetermined stage of collet operation. Voltage is conducted through the switch 32c to the crossfeed circuit represented by block 41. This crosscouple arrangement bypasses the signal distributor 22 and constitutes means for distributing a stop signal from one segment of the system and provide a start signal to another segment.

TURRET

A third major mechanism of a standard lathe is a tool holding turret. A typical turret has six tool positions and is self-rotating and self-indexing whereby each time the turret is moved into the work area, the turret rotates to and indexes in the next tool position.

In accordance with this example of the invention, a mechanical actuator is provided for moving the turret carriage toward and away from the work area. As in the case of the crossfeed, the actuator may be an electrical motor which drives a crank and arm linkage with the arm pivotally attached to the turret. One revolution of the crank and motor shaft moves the turret through one cycle and during this cycle, a change of turret tool position occurs.

As shown in FIG. 1, a start signal from the distributor 22 may be routed along one of the turret start conductors 64a, 64b, 64c. A sequence switch 65 selects one of the start signals and routes it to a turret control circuit 66. An actuator 67 is thereby controlled to move mechanically the turret tools into and out of the working area. A turret speed controller 68 serves to provide high and low speed operation of the turret actuator 67 and monitoring sensors 70a, 70b, 70c are provided to supply signals at appropriate times to select the desireable speed mode. A status sensor 71 generates a stop signal at preselected stages of turret operation for terminating the operation of the actuator 67. The stop signal may also be routed to the distributor 22 to become a start signal for another operation. For simplicity and clarity in the drawings, only three turret positions are represented, rather than the usual six.

Figure 4:
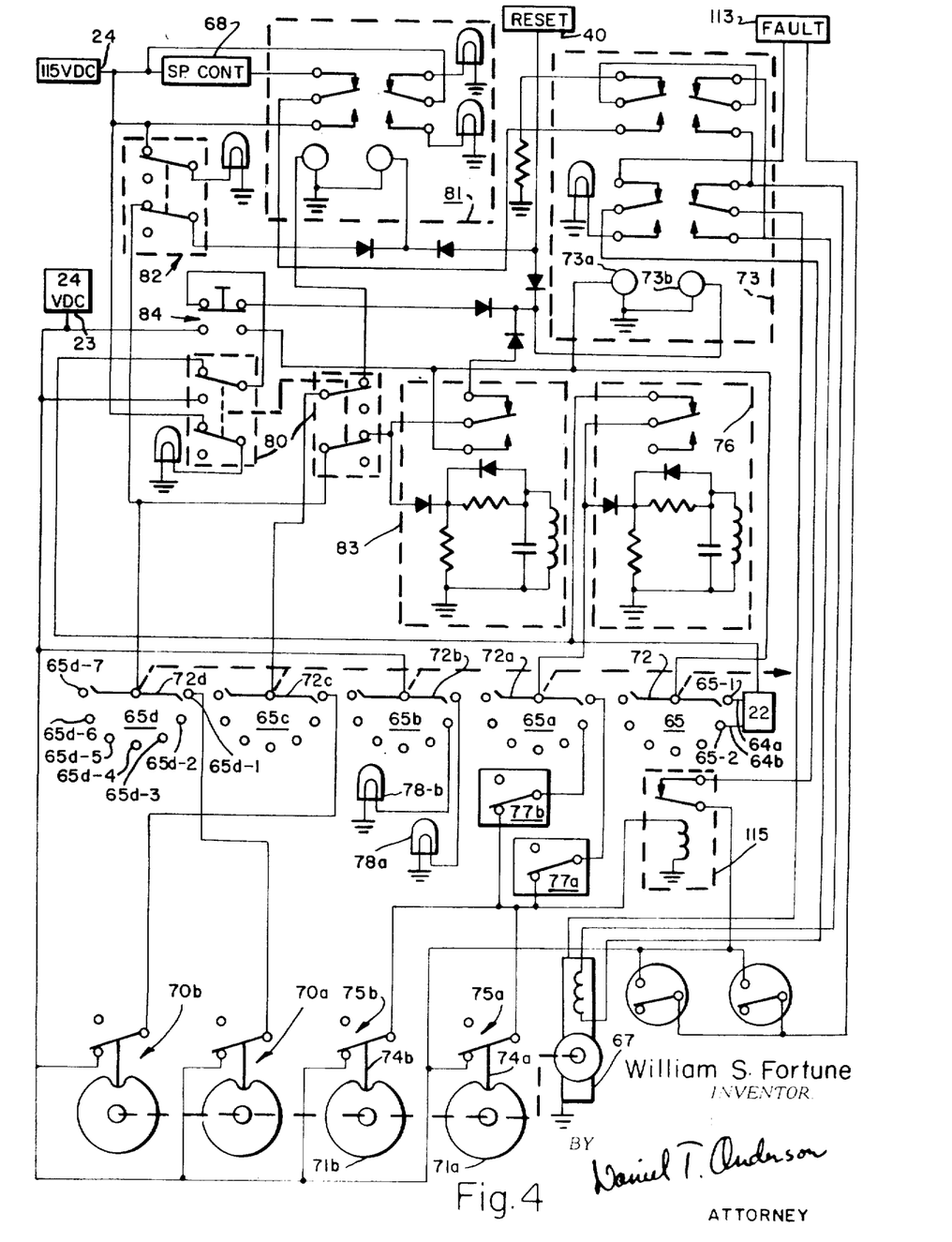
FIG. 4 is a more detailed schematic diagram of that portion of FIG. 1 which relates to the operation of the lathe turret.

FIG. 4 is a more detailed schematic diagram of the turret circuitry. The general features of the crossfeed circuitry, it may be understood, are used in the turret circuitry also. Because the usual lathe turret has six tool positions, a ganged-stepper switch is included for automatically skipping the non-used positions. The stepper is included for automatically skipping the non-used positions. The stepper switch has six banks labeled 65, 65a–65d, 65e (FIG. 5) and each bank has at least six contacts corresponding to each of the six turret positions. For clarity, only a typical set of connections is shown.

As depicted in FIG. 4, a first turret start signal is routed from the distributor 22 to a first contact 65-1 of the stepper switch bank 65. A second start signal may be distributed along the conductor 64b to the contact 65-2. The stepper contact arm 72 conducts the first start signal voltages from the contact 65-1 to the set-coil 73a of a motor relay 73. The turret actuator or motor 67 is thus activated until a stop signal is impressed upon the motor relay reset-coil 73b. The sequence-switch or stepper-bank 65 is stepped to the second contact position after the first start signal has been routed.

The stepper-bank 65a provides routing of various stop signals. Each turret tool position has associated therewith a sensor for producing a stop signal associated with each of the six turret positions. As shown in FIG. 4, and similar to the crossfeed circuit discussed above, the turret stop sensor includes the cam 71a. The cam depression is aligned on the shaft of the motor 67 so as to cause a follower 74a to close a cam switch 75a, as shown, when the lathe turret is in its position most distant from the workpiece. This then allows a stop rearward signal from the signal buss 23 to be impressed upon the stepper bank 65a. The stepper contact arm 72a then routes the stop rearward signal through a one-shot switching circuit 76 and thereafter to the motor set-coil 73b. The operation of the motor 67 is thereby terminated.

It may be noted that the components of the one-shot circuit 76 are essentially similar to those of the one-shot circuit 33 (FIG. 2). The pulse output of the one-shot circuit 76 is also routed to the signal distributor 22. The stop signal may then become a start signal.

A second stop cam 71b is provided for producing a signal at some other position of turret carriage travel and may be referred to as a stop forward monitor. Either the stop forward or rearward sensor may be rendered ineffective by the operation of a by-pass switch 77a. Since there are six turret positions, each associated with a respective electrical contact on the stepper bank 65a, there may be provided a series of six bypass switches. A second such switch is shown and labeled 77b; others are omitted for clarity.

A third stepper bank 65b is utilized to indicate which turret position is being used. Current is conducted from the buss 24 through the stepper contact arm 72b and then to one of the six lamps that may be provided, such as the lamps 78a, 78b.

It may be noted that the crossfeed circuitry includes means for changing the speed of the actuator motor thereby conserving time by operating at high speeds during non-cutting intervals. The turret may be similarly automated and programmed.

To this end, a cam-switch arrangement 70b is provided which routes a signal from the control buss 23 to one of the six electrical contacts of the stepper-bank 65c. Current is then routed through an auto-manual switch 80 and from there to the set-coil of a speed relay 81. The speed controller 68 is thereby bypassed and the motor 67 operates at full speed. A similar high speed sensor circuit is provided for each of the six turret positions and each is connected to one of the contacts at the stepper-bank 65c. The speed relay 81 operates in the same manner as speed relay 57 (FIG. 3) and has similar components.

A low speed control circuit is also provided. A cam-switch arrangement 70a routes current to the stepper-bank 65d and then through a speed selector switch 82 to the reset-coil of the relay 81. The speed controller 68 thereafter acts to cut power to the motor 67 for a suitable lower speed for the cutting operation.

Simultaneously, voltage is also routed from the stepper-bank 65d through another one-shot switching circuit 83 to the reset coil of the motor 67, and, as in the crossfeed case, the motor 67 is turned off. But, in sequence, the one-shot circuit 83 then reroutes current to the set coil of the motor relay 73. Thus, in the transition from high to low speed motor operation, the motor 67 is turned off thereby acting to brake the motor to a stop as heretofore explained. The low speed motor rpm is thereby nearly instantaneously obtained; and there is little or no coasting of the motor to the slower speed.

The turret circuitry of FIG. 4 also includes a push-button switch 84, as does the crossfeed and collet circuitry. When the auto-manual switch 80 is thrown to its state opposite from that shown, the push-button switch 84 may be used to advance manually the operation of the turret.

When the auto-manual switches 34, 62, 80 shown in FIGS. 2, 3 and 4, are set to the manual position, each of the control circuits may be separately set up for performing a selected set of operations. Thus, an operator may check the various cutting depths, adjust motor speeds to optimum, and make other standard lathe adjustments before utilizing the automatic control features. Similarly, the automatic operation may be interrupted by placing any of the auto-manual switches into the manual mode. Returning the auto-manual switch to the automatic mode allows the automatic sequencing of events to continue.

Figure 5:
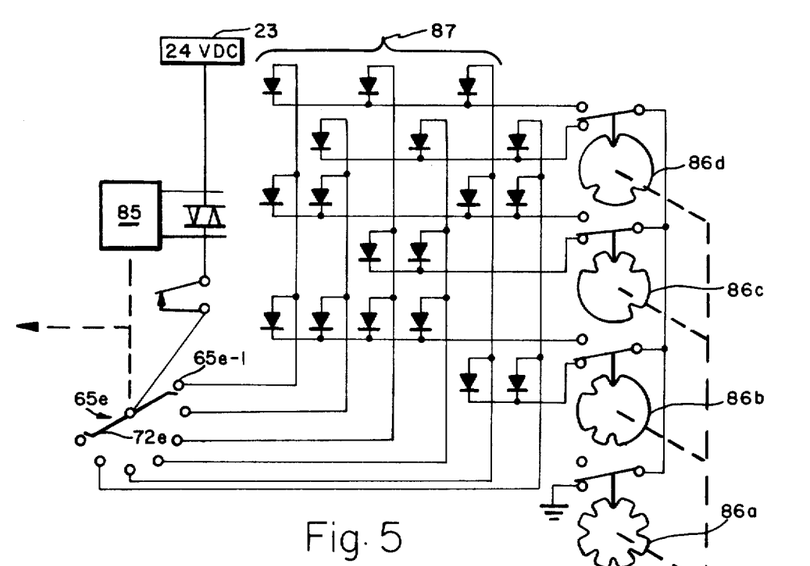
FIG. 5 is a schematic diagram of additional circuitry for correlating the operation of the lathe circuitry of FIG. 4.

As earlier noted, one bank of electrical contacts 65e of the stepper switch is shown in FIG. 5. This portion of the turret circuitry exhibits the feature of insuring that the turret circuitry will be associated with the proper turret position. There may be six possible turret start signals, one for each turret position, and it is important that the contact arms of the stepper switches be in contact with the first electrical contact when the first of the turret start signals is received.

The circuitry of FIG. 5 ensures a matching of the turret tool position of the stepper switch location. If the stepper contact arm 72e is in contact with any non-correlated contact, a motor 85 will have current furnished thereto and will mechanically advance the stepper switch to the next contact position. It will do so until a contact is reached which is correlated with the turret position.

To this end, a turret indexing wheel 86a is mounted on the shaft of the rotating turret and has cam depressions corresponding to each of the six turret positions. The encoding cams 86b, 86c, 86d and the diode circuits, collectively labeled 87, cooperate with the indexing wheel to form a binary encoder.

By way of example, the position, as shown, of the indexing cam 86a and encoding cams 86b-86d may be designated as the number one turret position. The stepper contact arm 72e is in contact with the contact 65e-1 assigned to the number one turret position. It will be noted that current through the motor 85 has no ground path through the binary encoder network. On the other hand, if the stepper contact arm 72e were on any other contact, a path to ground would be provided. Therefore, the stepper switch would be advanced until the first contact 65e-1 were reached. In this way, the turret tool is always correlated to the proper stepper switch contact position. Thus, start, stop, and other control signals will be processed in the proper sequence. If the turret and stepper-switch for any reason lose synchronization, it is automatically reestablished as follows. As power is next applied, the stepper will automatically home to the proper turret position. This is accomplished because all five positions of the stepper deck are energized. This causes the motor 85 to run until it selects the one position without energy or a ground path, and the motor 85 will come to rest at the home position which is synchronization with the proper turret position.

SIGNAL DISTRIBUTOR

This example of the basic machine tool control circuit further includes means to distribute the various control signals in a predetermined manner to ensure the desired tool operations. The signal distributor 22 is shown in FIG. 6.

The objective here is to collect the various stop signals from the collet, crossfeed, and turret circuitry; provide a suitable ordered array of signals which may converted to start signals; and, provide changeability in the selected order of machine tool events.

Figure 6:
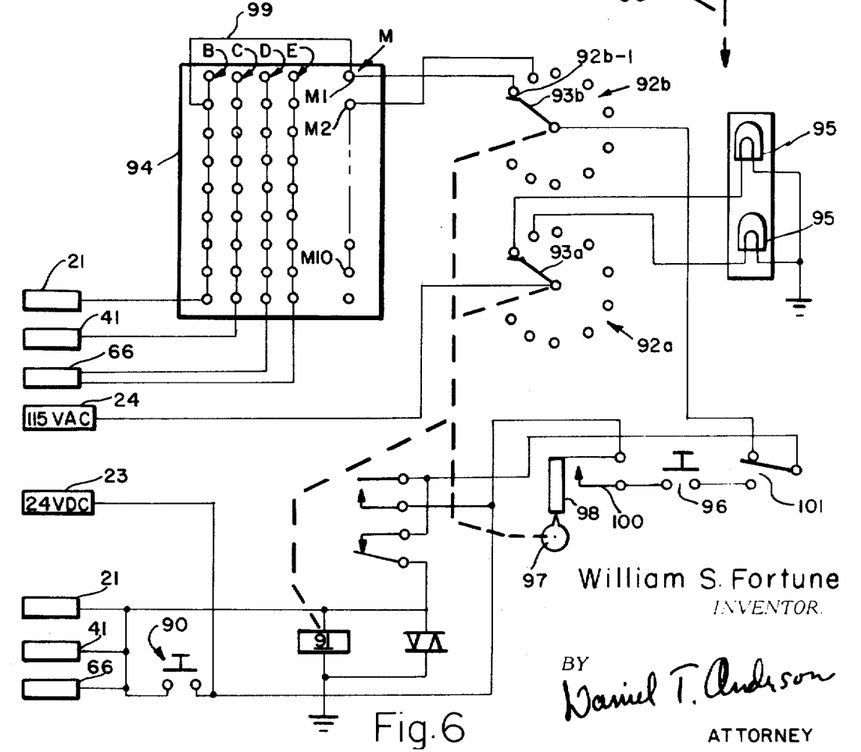
FIG. 6 is a more detailed schematic diagram of that portion of FIG. 1 which relates to the distribution of various system signals.

Referring to FIG. 6, the stop signals, the generation of which has been discussed supra, are collected from the collet control circuit 21, crossfeed control circuit 41, and turret control circuit 66. A stop signal may be simulated by depressing the step-program push-button switch 90. Each of these signals will be routed through a motor 91 to a rotary switch of the stepping variety. Upon routing of a stop signal to the rotary switch, its rotor arm is advanced by the motor 91. It is this action that provides the desired ordered array of signals which may be converted to start signals.

The rotary switch shown is a ganged switch having rotary contact banks 92a, 92b, each having a rotary arm 93a, 93b for contacting each of plurality of electrical contacts, such as 92b-1. The stop signals are routed to the rotary arm 93b. As noted, after each stop signal is routed through the rotary arm 93b, the rotary arm is advanced to the next contact.

An electrical patch board 94 is included and each contact of the rotary switch 92b is connected to an electrical jack such as M1 thereof. A series of jacks, column B, are electrically connected in series to route a start signal to the collet circuitry 21. Similarly, jacks in column C route signals to the crossfeed circuitry 41; and jacks in column D–E route signals to the six turret start signal contacts of the stepper switch 65 (FIG. 4).

It may be seen that an electrical jumper may be used to interconnect the first of the M column jacks M1 to another jack so as to begin any desired machine tool operation. For example, connecting jack M1 to any of the B jacks by means of a jumper 99 routes a start signal to the lathe collet circuitry. As another example, to make the crossfeed cutting operation the tenth in a series of operations, the jack M10 is jumpered to one of the jacks in column C.

The contacts of the rotary switch 92a are connected to lamps 95. These then indicate which particular operation of a sequence of machine operations is being performed.

The objective of providing changeability in the selected order of machine tool operations is readily attained. The sequential set of signals provided by the rotary switch 92b may be interconnected to any of the various jacks of the patch board 94. Thus, the machine tool automated program may be changed by simple rearrangement of electrical jumpers.

Since the system may be stopped at any of several stages of a sequence, it may be desirable to return the rotary switch to its first position so as to restart the programmed sequence. A homing push-button switch 96 and cooperating means are included in this example. A cam 97 mounted on the rotary switch shaft actuates a follower 98 to open a contact 100. If an auto-manual switch 101 is in a coupling state opposite to that shown and the homing switch 96 is depressed, current will be drawn by the motor 91 until the contacts 100 are open. At this time the rotary switches are positioned to align the rotary arms with the first electrical contact. The program is thereby set to start the desired sequence of, in this example, lathe operations.

Other rotary switches may be ganged to those described. These may distribute signals to such devices as a counter which may be of a type which records only the final signal in the programmed sequence. Thus, the recorded signals indicate the number of workpieces which are completed.

In accordance with the principles of the invention, the signal distributor may be expanded and varied in other ways. For example, the patch board 94 may be expanded to include jacks which distribute start signals to any of a number of machine operations. Coolant oil may be directed onto a cutting tool and the workpiece in response to a stop signal or some other control or monitoring signal; for example, the slow speed mode signal generated by the crossfeed circuitry including switch 50c (FIG. 3) may be used to start the flow of oil coolant.

FAULT CIRCUIT

An important aspect of the illustrated example of the present invention is the fault circuitry combination. The fault circuit described allows the lathe system to be operated continuously and without an operator present.

The fault circuitry may include a network of various transducers which produce an electrical signal when faulty conditions exist. The fault signals serve, in this example, to return all of the lathe system relays to their off position thereby halting further lathe operation. The fault circuitry may actuate a remote alarm monitored by an operator or, for example, initiate automatic telephone dialing to a stand-by technician.

The fault circuitry includes means for detecting the overtravel of the electric motors. In normal operation the collet, crossfeed, and turret motors 17, 43, 67 should stop with the cam switch followers 31a, 50a, 50b, 74a, 74b in the slot of their respective cams. Referring to FIG. 2, the collet circuitry includes a fault relay 110 having a coil 111 and contacts 112.

One terminal of the contact 112 is connected to the control buss 23. If the contacts 112 are closed, voltage will be impressed upon contacts 26f of the motor relay 26. If the contacts 26f are closed, voltage may be impressed upon the fault monitoring circuit 113. During operation of the collet motor 17, the fault relay contacts 112 are closed and the motor relay contacts 26f are open.

The cam switch 32a routes a stop signal to the one-shot switching 33 as previously explained. At the same time, current is drawn by the fault relay coil 111 to open the contacts 112. Thus, when there is no motor overshoot, voltage will not be present through the fault relay contacts 112 to the motor relay contacts 26f.

However, if the motor relay 26 is reset to its off position, as shown, and if the collet motor 17 overshoots causing the cam switch 32a to open, the fault contacts 112 will close and a fault signal will then be routed through the fault relay contacts 112, the motor relay contacts 26f, and to the fault circuitry 113.

In FIG. 3, and 4, similar circuitry is provided to monitor the crossfeed and turret motors. A crossfeed fault relay 114 and a turret fault relay 115 may serve essentially the same function and operate in the same manner as does the collet fault relay 110. If either the crossfeed motor 43 or the turret motor 67 overshoot the stop position, a fault relay is closed thereby providing voltage to the fault circuit 113. Such overshoot may indicate normal wear of the motor brushes and indicate that replacement or repair is due.

Figure 7:
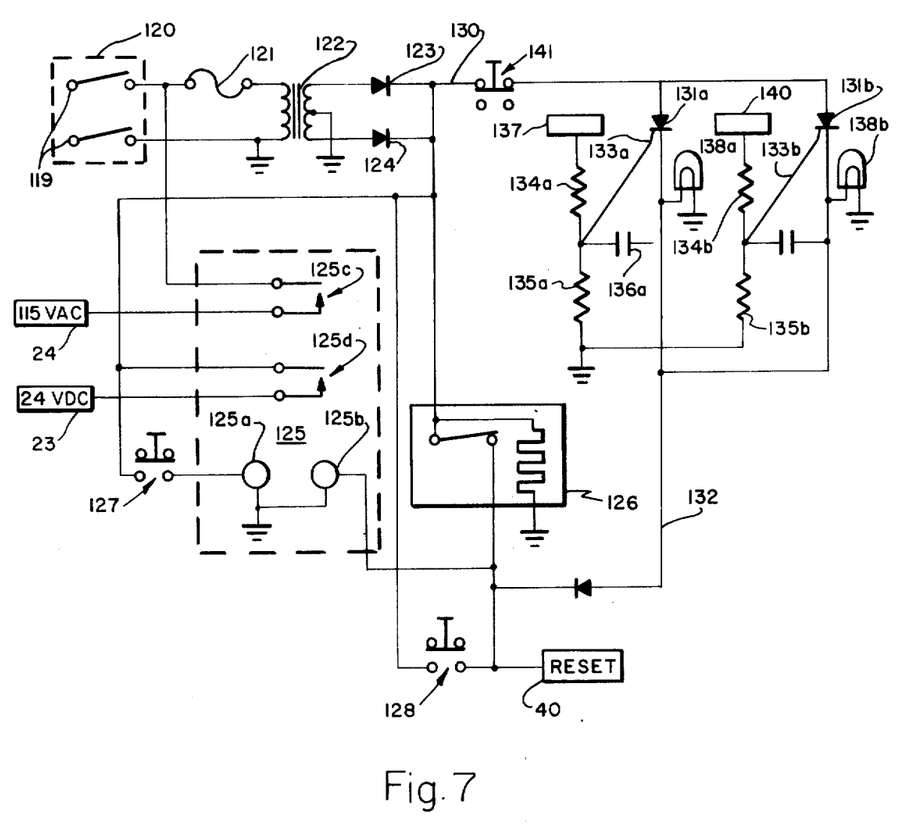
FIG. 7 is a more tailed schematic diagram of that portion of FIG. 1 which relates to the system power supply and fault circuitry.

The fault monitoring circuitry 113 is shown in further detail in FIG. 7 along with the power circuitry for the automated lathe system. Electrical power, which may be 117-volt alternating current, is supplied to terminals 119 of a main power switch 120. The power circuit includes a fuse 121, a transformer 122 and rectifiers 123, 124. The secondary of the transformer provides, in this example, 48 volts and is center tapped whereby 24-volt direct current is available after rectification.

A power relay 125 is shown for providing alternating current to the power buss 24 through the power relay contacts 125c. Control voltage of 24 volts direct current is provided through the power relay contacts 125d to the control buss 23.

When power is switched on, the contacts of a thermal relay 126 close and the thermally controlled operation thereof may delay opening of the contacts for about 3 seconds. Thus, the power relay contacts will be assured of being opened with the reset buss 40 energized. This resets all system relays to the off position as a safety feature. When the thermal relay 126 opens, the power and control busses 23, 24 may be energized by depressing switch 127. The system may be manually stopped by depressing a stop switch 128 to reset the power relay 125 to the off position.

As further shown in FIG. 7, the fault monitoring circuitry is connected to the power supply through a conductor 130. The fault monitoring circuitry may include one or more SCR (silicon controlled rectifiers) connected between conductors 130, 132 to provide voltage to the reset-coil of the power relay 125. When such power is provided, the system is turned off.

A first SCR 131a has its gate electrode 133a controlled by a resistance-capacitance network including elements 134a, 135a, 136a. These elements co-act to delay the firing of the SCR 131a, by a predetermined increment. The SCR gate control voltage is provided by one of the fault sensor circuits such as the collet motor overshoot sensor circuit labeled as diagram block 137. The operation of this fault sensor was heretofore explained; it may be noted, however, that it includes fault relay 110 (FIG. 2). Lamp 138a is included to indicate the relevant fault and a switch 141 serves to reset or turn off the SCR network.

Other SCR networks such as SCR 131b may be included to monitor other fault sensor circuits represented by a block 140. Other fault sensor circuits which may be connected to the fault monitoring circuit may include a sensor to detect motor overtorque. Also shown in FIGS. 3 and 4 are overtorque elements 150, and 151, which each provide a voltage path to one of the SCR networks of the fault monitoring circuitry shown in FIG. 7.

These torque sensors are located in the arm-link of the crank and arm linkage associated with the various actuator motors. The sensor includes a resilient element which forms a portion of the arm-link. Further included is a microswitch which will close if the resilient element is sufficiently compressed. Thus, if the lathe tool encounters significant interference, overtorque occurs and the microswitch passes voltage to the fault monitoring circuit.

Other sensors may be used to detect the time duration to complete the workpiece, sense temperature of a cutting tool, sense motor bearing temperature, sense coolant oil level, detect when a material feeder is out of material, sense vibration, or detect whether more than one motor is running at the same time. Such sensors may be adapted to provide a fault signal voltage to fire an SCR in the fault monitoring circuit of FIG. 7.

It will be appreciated from the foregoing that a very useful control circuit is provided for and in combination with an automated turret lathe system. The circuit has been illustrated by showing how electrical signals may be distributed to achieve the desired automation; however, the invention may be implemented with fluidic signals as well. The circuit achieves the objects and exhibits the advantage discussed hereinabove. For example, the disclosed circuitry enables a turret lathe to be made self-operating and self-fault-finding, yet, the lathe retains the flexibility of a manually operated lathe. The system of the invention, while highly automated and versatile, is relatively inexpensive to embody in a standard machine-shop lathe.

I claim:

1. A machine-tool control system, comprising:
   a. a plurality of mechanical actuators each connected to a machine-tool mechanism of the character to perform a machine-tool operation, each of said plurality of mechanical actuators being operably responsive to an electrical actuator signal;
   b. a like plurality of control circuits each being coupled to one of said plurality of mechanical actuators, and of the character to provide an actuator signal thereto in response to electrical start and stop signals;
   c. a manually operable start circuit means coupled to at least one of said plurality of control circuits for impressing a start signal thereon;
   d. a like plurality of status sensors each coupled to one of said plurality of mechanical actuators for sensing a preselected operation status thereof and for generating an electrical signal representative thereof, said like plurality of status sensors each being coupled to one of said plurality of control circuits and each being adapted to impress said status indicating signal thereon as a stop signal, further, said like plurality of status sensors each having means for initial adjustment to relate the excitation of said stop signal to a preselected condition existing at the machine-tool mechanism;
   e. signal distributing means coupled to each of said like plurality of status sensors and to each of said like plurality of control circuits for collecting each stop signal, and for impressing said stop signals as start signals on said control circuits in a predetermined sequence whereby a preselected sequence of machine-tool operation may be automatically controlled;
   f. at least one of said like plurality of actuator control circuits having a latching relay having one terminal of a contact thereof selectively connectable to a source of an electrical actuator signal and the other terminal of the contact connected to one of said plurality of mechanical actuators, said latching relay having the reset coil thereof coupled to the associated status sensor, and having the set coil thereof coupled to said signal distributing means whereby, a start signal from said distributing means will close the relay contacts to furnish the electrical actuator signal to said one mechanical actuator, and whereby a stop signal impressed upon the reset coil of said latching relay will disengage the contacts to thereby interrupt the electrical actuator signal to said one actuator, and
   g. one-shot circuit means having an input terminal thereof coupled to the output terminal of said associated status sensor and the output terminal of said one-shot circuit means being coupled to the reset coil of said latching relay whereby, a stop signal of relatively long duration may be converted to a stop signal of selected shorter duration.

2. The machine-tool control system of claim 1 wherein the output terminal of said one-shot circuit means is also coupled to said signal distributing means whereby the stop signal distributed as a start signal to another actuator control circuit will be of said selected shorter duration.

3. The machine-tool system of claim 2 wherein one of said machine mechanisms comprises collet means of a lathe and wherein a status sensor associated therewith is designed to sense when the collet means is in a closed position.

4. The machine-tool control system of claim 3 further comprising:
   a. a second collet status sensor coupled to said collet means for sensing when said collet means is in an open position and for producing an electrical signal representative thereof, the electrical output thereof being coupled to the input terminal of said one-shot circuit means for impressing the signal of said second collet sensor upon the reset coil of said latching relay whereby the collet operation may be stopped in the open position.

5. The machine-tool control system of claim 4 wherein said circuit further includes electrical switch means coupled between said second collet sensor and said control circuit to render the second collet status sensor inactive.

6. The machine-tool control system of claim 5 further comprising:
   a. a third collet status sensor coupled with said collet means for sensing when said collet means is open and for producing an electrical signal representative thereof;
   b. a workpiece sensor associated with the workpiece for sensing when the workpiece is in a preselected working position and for producing an electrical signal representative thereof; and
   c. workpiece feeder means coupled to said third collet status sensor and to said workpiece sensor for advancing a workpiece through the open collet means and into a preselected working position, said feeder means being made operably responsive to the electrical signal from said third collet status sensor and operably terminable in response to the electrical signal from said workpiece sensor, whereby the lathe may be continuously fed with workpiece material.

7. The machine-tool control system of claim 6 wherein said workpiece sensor comprises a photo-cell circuit, the photo-cell light beam of said circuit being interrupted due to the presence of the workpiece in the preselected working position.

8. The machine-tool control system of claim 2 wherein said one of said plurality of mechanical actuators includes electrical motor means having an electrical input terminal thereof connected to said other terminal of said latching relay, said one mechanical actuator being designed to move the associated machine-tool mechanism through an operating cycle for each shaft revolution of said electrical motor.

9. The machine-tool system of claim 8 wherein said associated status sensor comprises:
   a. cam means mounted on the shaft of said electrical motor means and having cam follower engaging means disposed to correspond to the preselected operation status;
   b. cam follower means associated with said cam means for providing actuation motion related to the preselected operation status;
   c. electrical switch means coupled to said cam follower means and being of the character to close the switch contacts when said cam follower means engages said follower engaging means of said cam means, said switch means having one terminal coupled to the input terminal of said one shot circuit means;
   d. an electrical energy source coupled to the other terminal of said switch means whereby a stop signal may be generated when the preselected operation status is obtained.

10. The machine-tool control system of claim 8 wherein the actuator signal provided to said electrical motor means is an electric current; and wherein the control circuit further comprises:
    a speed control element having an output terminal coupled to the input terminal of said electrical motor means and having an input terminal selectively connectable to a source of electrical current, said speed control element being designed to control selectively the operating speed of said motor means.

11. The machine-tool control system of claim 10 further comprising:
    a. controller circuit means associated with said speed control element for bypassing said speed control element in response to a high speed signal and for effectively activating said speed control element in response to a low speed signal; and
    b. wherein one of said plurality of status sensors is coupled to said one mechanical actuator and the electrical output terminal thereof is coupled to said controller circuit means for providing a high speed signal; and
    c. wherein another of said plurality of status sensors is coupled to said one mechanical actuator and the electrical output terminal thereof is coupled to said controller circuit means for providing said low speed signal.

12. The machine-tool control system of claim 2 wherein one of said machine mechanisms is a crossfeed tool means of a machine-shop lathe and wherein a said status sensor associated therewith is adapted to detect when the crossfeed tool is in an idle position.

13. A machine-tool control system, comprising:
    a. a plurality of mechanical actuators each connected to a machine-tool mechanism of the character to perform a machine-tool operation, each of said plurality of mechanical actuators being operably responsive to an electrical actuator signal;
    b. a like plurality of control circuits each being coupled to one of said plurality of mechanical actuators, and of the character to provide an actuator signal thereto in response to electrical start and stop signals;
    c. a start circuit means coupled to at least one of said plurality of control circuits for impressing a start signal thereon;
    d. a like plurality of status sensors each coupled to one of said plurality of mechanical actuators for sensing a preselected operation status thereof and for generating an electrical signal representative thereof, said like plurality of status sensors each being coupled to one of said plurality of control circuits and each being adapted to impress said status indicating signal thereon as a stop signal;
    e. signal distributing means coupled to each of said like plurality of status sensors and to each of said like plurality of control circuits for collecting each stop signal, and for impressing said stop signals as start signals on said control circuits in a predetermined sequence whereby a preselected sequence of machine-tool operation may be automatically controlled;

said signal distributing means comprises:
    a. rotary switch means having a rotating contact arm and having a plurality of peripherally located contacts for sequential contact with the contact arm, said rotary switch contact arm being coupled to at least of one of said like plurality of status sensors;
    b. electrical patch board means having a plurality of electrical jack means, at least one said jack means being coupled to one of said like plurality of control circuits; and
    c. electrical jumper means for interconnecting each of said rotary switch peripheral contacts to one of said electrical patch board electrical jack means whereby a stop signal from one of said plurality of status sensors may be routed as a start signal to one of said plurality of control circuits.

14. A machine-tool control system, comprising:
    a. a plurality of mechanical actuators each connected to a machine-tool mechanism of the character to perform a machine-tool operation, each of said plurality of mechanical actuators being operably responsive to an electrical actuator signal;
    b. a like plurality of control circuits each being coupled to one of said plurality of mechanical actuators, and of the character to provide an actuator signal thereto in response to electrical start and stop signals;
    c. a start circuit means coupled to at least one of said plurality of control circuits for impressing a start signal thereon;
    d. a like plurality of status sensors each coupled to one of said plurality of mechanical actuators for sensing a preselected operation status thereof and for generating an electrical signal representative thereof, said like plurality of status sensors each being coupled to one of said plurality of control circuits and each being adapted to impress said status indicating signal thereon as a stop signal;
    e. signal distributing means coupled to each of said like plurality of status sensors and to each of said like plurality of control circuits for collecting each stop signal, and for impressing said stop signals on said control circuits in a predetermined sequence whereby a preselected sequence of machine-tool operation may be automatically controlled;
    f. fault sensor means operatively associated with a portion of the control system for sensing an unwanted operating condition and for generating a fault signal representative thereof; and
    g. fault monitoring circuit means coupled to the output terminal of said fault sensor for generating a stop signal representative of the fault monitoring circuit means being coupled to each of said plurality of control circuits for impressing the stop signal thereon.

15. A machine-tool control system, comprising:
    a. at least one mechanical actuator coupled to a machine-tool mechanism, the machine-tool mechanism being of the character to perform a standard machine-tool operation, said mechanical actuator being operably responsive to an actuator signal;
    b. at least one machine-tool operation status sensor coupled to the machine-tool mechanism for sensing a preselected operation status thereof and for producing a stop signal representative thereof, said operation status sensor having means for initial adjustment to relate the excitation of said stop signal to a preselected condition existing at the machine-tool mechanism;
    c. an actuator control circuit coupled to said one machine-tool operation status sensor and to said one mechanical actuator for generating and impressing an actuator signal upon said mechanical actuator in response to a start signal and for terminating said actuator signal in response to said stop signal whereby the operation of said one actuator is selectively terminable in response to the preselected operation status;

d. a signal distributing circuit coupled to said one machine-tool operation status sensor and to an actuator control circuit for distributing the stop signal from said sensor to said actuator control circuit wherein the stop signal may serve as a start signal;

e. said machine mechanism comprising collet means of a lathe and a status sensor associated therewith being designed to sense when the collet means is in a closed position; and f. a second collet status sensor coupled to said collet means for sensing when said collet means is in an open position and for producing an electrical signal representative thereof, the electrical output thereof being coupled to said signal distributing circuit for impressing the signal of said second collet sensor upon said mechanical actuator whereby the collet operation may be stopped in the open position.

16. The machine-tool control system of claim 15, further comprising:

a. a third collet status sensor coupled with said collet means for sensing when said collet means is open and for producing an electrical signal representative thereof;

b. a workpiece sensor associated with the workpiece for sensing when the workpiece is in a preselected working position and for producing an electrical signal representative thereof; and c. workpiece feeder means coupled to said third collet status sensor and to said workpiece sensor for advancing a workpiece through the open collet means and into a preselected working position, said feeder means being made operably responsive to the electrical signal from said third collet status sensor and operably terminable in response to the electrical signal from said workpiece sensor, whereby the lathe may be continuously fed with workpiece material.

17. A machine-tool control system, comprising:

a. at least one mechanical actuator coupled to a machine-tool mechanism, the machine-tool mechanism being of the character to perform a standard machine-tool operation, said mechanical actuator being operably responsive to an actuator signal;

b. at least one machine-tool operation status sensor coupled to the machine-tool mechanism for sensing a preselected operation status thereof and for producing a stop signal representative thereof, said operation status sensor having means for initial adjustment to relate the excitation of said stop signal to a preselected condition existing at the machine-tool mechanism;

c. an actuator control circuit coupled to said one machine-tool operation status sensor and to said one mechanical actuator for generating and impressing an actuator signal upon said mechanical actuator in response to a start signal and for terminating said actuator signal in response to said stop signal whereby the operation of said one actuator is selectively terminable in response to the preselected operation status;

d. a signal distributing circuit coupled to said one machine-tool operation status sensor and to an actuator control circuit for distributing the stop signal from said sensor to said actuator control circuit wherein the stop signal may serve as a start signal;

said signal distributing circuit comprising:

a. rotary switch means having a rotating contact arm and having a plurality of peripherally located contacts for sequential contact with the contact arm, said rotary switch contact arm being coupled to at least one of said like plurality of status sensors;

b. electrical patch board means having a plurality of electrical jack means, at least one said jack means being coupled to one of said control circuits; and c. electrical jumper means for interconnecting each of said rotary switch peripheral contacts to one of said electrical patch board electrical jack means whereby a stop signal from said at least one machine-tool operation status sensor may be routed as a start signal to said control circuit.

18. A machine-tool control system, comprising:

a. at least one mechanical actuator coupled to a machine-tool mechanism, the machine-tool mechanism being of the character to perform a standard machine-tool operation, said mechanical actuator being operably responsive to an actuator signal;

b. at least one machine-tool operation status sensor coupled to the machine-tool mechanism for sensing a preselected operation status thereof and for producing a stop signal representative thereof, said operation status sensor having means for initial adjustment to relate the excitation of said stop signal to a preselected condition existing at the machine-tool mechanism;

c. an actuator control circuit coupled to said one machine-tool operation status sensor and to said one mechanical actuator for generating and impressing an actuator signal upon said mechanical actuator in response to a start signal and for terminating said actuator signal in response to said stop signal whereby the operation of said one actuator is selectively terminable in response to the preselected operation status;

d. a signal distributing circuit coupled to said one machine-tool operation status sensor and to an actuator control circuit for distributing the stop signal from said sensor to said actuator control circuit wherein the stop signal may serve as a start signal;

e. fault sensor means operatively associated with a portion of the control system for sensing an unwanted operating condition and for generating a fault signal representative thereof; and f. fault monitoring circuit means coupled to the output terminal of said fault sensor for generating a stop signal representative of the fault condition, said fault monitoring circuit means being coupled to said control circuit for impressing a stop signal thereon.

* * * * *